(12) United States Patent
Conboy et al.

(10) Patent No.: US 6,216,948 B1
(45) Date of Patent: Apr. 17, 2001

(54) PROTECTIVE RAIL WITH INTEGRATED WORKPIECE SENSORS

(75) Inventors: Michael R. Conboy, Austin; Russel Shirley, Pflugerville, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/175,624

(22) Filed: Oct. 20, 1998

(51) Int. Cl.[7] .................................................. G06K 15/00
(52) U.S. Cl. ....................... 235/383; 235/385; 235/462.01
(58) Field of Search .................... 235/462.01, 462.43, 235/383, 385; 438/7; 209/583, 587; 700/111, 114, 115

(56) References Cited

U.S. PATENT DOCUMENTS

| | | | |
|---|---|---|---|
| 4,309,600 | * 1/1982 | Perry et al. | 235/375 |
| 4,581,783 | * 4/1986 | Hayes et al. | 470/66 |
| 4,621,410 | * 11/1986 | Williamson | 483/1 |
| 4,810,146 | * 3/1989 | Sinclair | 411/342 |
| 4,833,770 | * 5/1989 | Esser et al. | 483/41 |
| 5,108,240 | 4/1992 | Liebig | 411/344 |
| 5,291,007 | * 3/1994 | Sakai | 235/457 |
| 5,495,097 | * 2/1996 | Katz et al. | 235/462.12 |
| 5,535,570 | 7/1996 | Lynn | 52/698 |
| 5,555,504 | * 9/1996 | Lepper et al. | 700/115 |
| 5,588,554 | * 12/1996 | Jones | 221/88 |
| 5,607,187 | * 3/1997 | Salive et al. | 283/67 |
| 5,842,685 | * 12/1998 | Purvis et al. | 256/67 |
| 5,883,374 | * 3/1999 | Mathews | 235/462.15 |
| 5,900,611 | * 5/1999 | Hecht | 235/454 |
| 5,923,017 | * 7/1999 | Bjorner et al. | 235/385 |
| 5,979,756 | * 11/1999 | Ahn et al. | 235/383 |
| 6,059,096 | * 5/2000 | Gladieux | 198/836.3 |

* cited by examiner

Primary Examiner—Karl D. Frech
Assistant Examiner—Jamara A. Franklin

(57) ABSTRACT

An apparatus for identification of work pieces and protection of equipment used to operate on the work pieces in a computer controlled manufacturing arrangement. The equipment to be protected includes at least one receptacle for holding a work piece, and the apparatus comprises a rail and an electronic sensor mounted to the rail. The rail is shaped to generally to surround a selected portion of the equipment and is arranged to be supported proximate the equipment to deflect objects from the equipment. The electronic sensor is mounted to the rail at a location to sense a work piece in the receptacle and arranged to be coupled to the computer.

15 Claims, 5 Drawing Sheets

PROTECTIVE RAIL WITH INTEGRATED WORKPIECE SENSORS

FIELD OF THE INVENTION

The present invention is generally directed to electronic identification of parts in an automated manufacturing arrangement, and more particularly to a rail having mounted thereon sensors for reading part identifiers.

BACKGROUND OF THE INVENTION

Automated manufacturing arrangements often use electronic sensors, for example, bar code readers, to track parts and work pieces as they move through the manufacturing process. Such arrangements also include track systems for transporting parts and work pieces from is one machine to another and unloading apparatus for removing the parts from the track system for processing by the various machines.

One problem that arises is that the automatic loading and unloading of parts to and from a track system sometimes interferes with the electronic sensing of the parts. Arrangements for manufacturing semiconductors typically include cassettes in which wafers are transported. The cassette loaders of some machines, for example, the wafer sorter from Kensington Labs, Inc., tilt out beyond the frame of the machine. The problems created are that the motion of the cassette loaders makes difficult the automatic reading of bar codes on cassettes. Instead of an automatic sensing of the cassette in the loader, an operator may be required to manually scan the bar codes on the cassettes once placed in the loaders. Furthermore, when the cassette loaders are tipped out from the machine they are prone to damage from accidental collisions with operators and with other equipment being moved about the factory floor.

Therefore, an apparatus that addresses the aforementioned problems is desirable.

SUMMARY OF THE INVENTION

In various embodiments, an apparatus is provided for identification of work pieces and protection of equipment used to operate on the work pieces in a computer controlled manufacturing arrangement. The equipment to be protected includes at least one receptacle for holding a work piece, and the apparatus comprises a rail and an electronic sensor mounted to the rail. The rail is shaped to generally to surround a selected portion of the equipment and is arranged to be supported proximate the equipment to deflect objects from the equipment. The electronic sensor is mounted to the rail at a location to sense a work piece in the receptacle and arranged to be coupled to the computer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood upon consideration of the following detailed description of various embodiments of the invention in connection with the accompanying drawings, in which.

Figure 1:
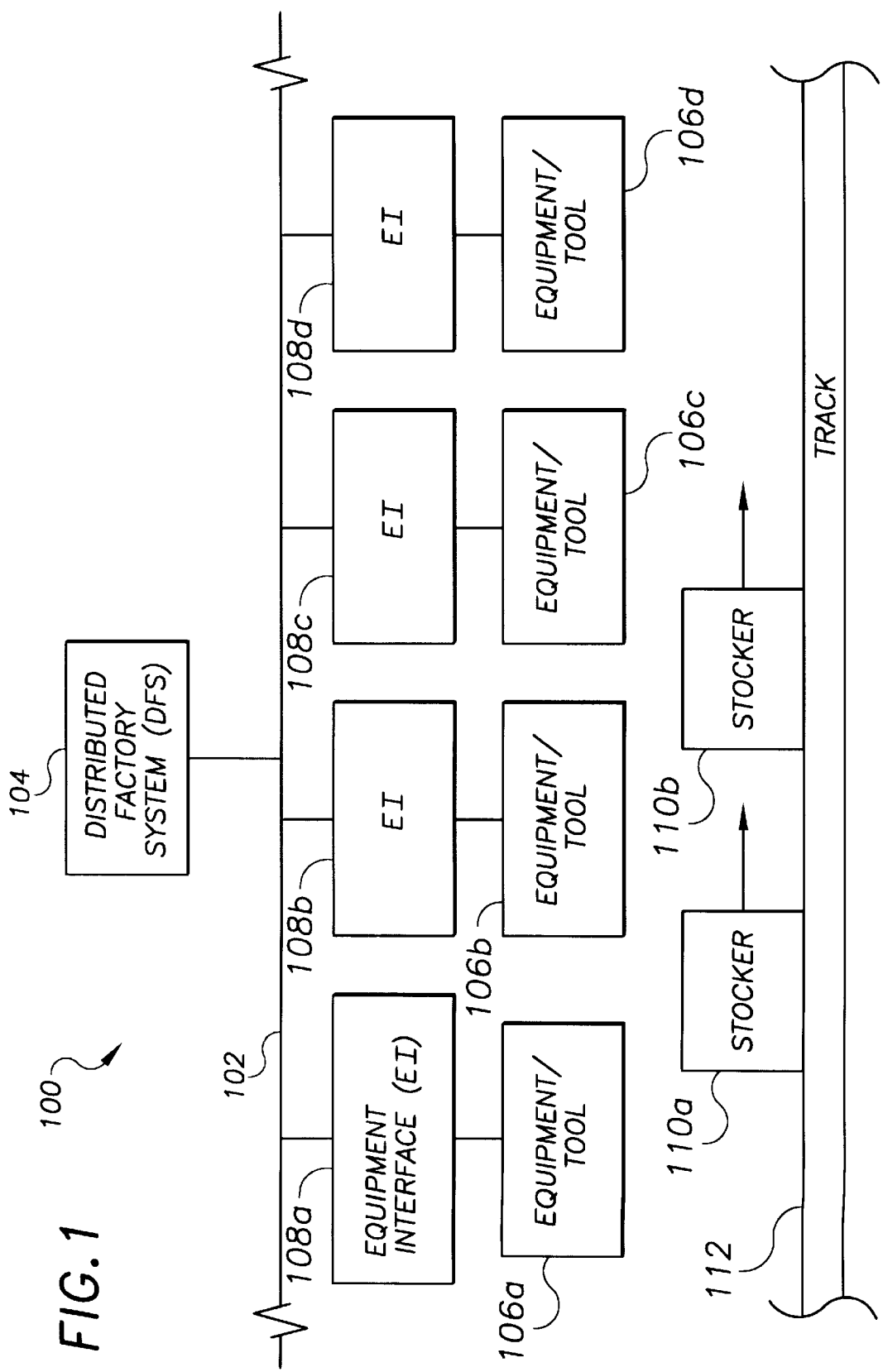
FIG. 1 is a block diagram of an example computer controlled manufacturing arrangement.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of machines used in computer controlled manufacturing arrangements, and particularly advantageous for such arrangements directed to semiconductor manufacturing. While the present invention is not so limited, an appreciation of various aspects of the invention is best gained through a discussion of various example applications described below.

FIG. 1 is a block diagram of an example computer controlled manufacturing arrangement 100. The arrangement includes a central bus 102 to which various control elements are coupled. The protocol used on the bus 102 is ISIS which is available from ISIS Distributed Systems. A distributed factory system (DFS) 104 includes Workstream software that is available from Consilium, Inc., for controlling the manufacturing process of semiconductor wafers. The DFS tracks the handling of wafers by logical lots and includes a database for such tracking.

Tools 106a–d are used in the manufacturing process and are coupled to the bus 102 via equipment interface workstations 108a–d, respectively. The workstations 108a–d run interface programs (not shown) that function as translators between the language of tools 106a–d and the ISIS protocol of the bus 102.

The stockers 110a–b are transported on the factory floor on a track 112, which is an overhead monorail in an example embodiment. The stockers are controlled by personal computers (not shown) that are also coupled to the bus 102. The software for controlling movement of the stockers 110a–b is available from Daifuku of Japan. It will be appreciated that additional tools and stockers, along with corresponding equipment interface workstations may be included in the computer controlled manufacturing arrangement 100.

Figure 2:
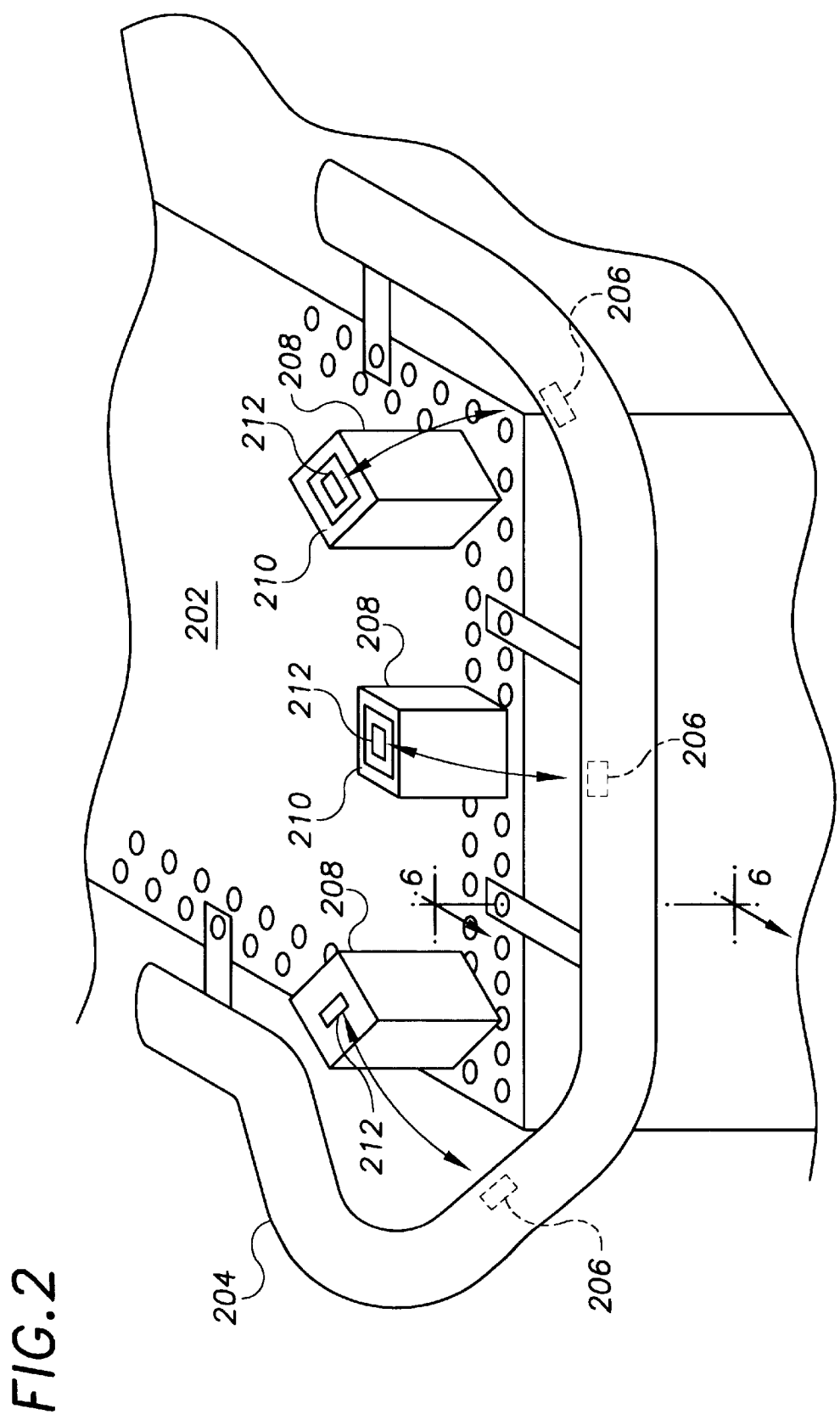
FIG. 2 is a partial perspective view of a tool to which is attached a protective rail having one or more integrated electronic sensors according to an example embodiment of the invention.

FIG. 2 is a partial perspective view of a tool 202 to which is attached a protective rail 204 having one or more integrated electronic sensors 206 according to an example embodiment of the invention. In an example application of the invention, the tool 202 is a wafer sorter and includes one or more cassette loaders (abbreviated as "loader") that are arranged to load cassettes from the stockers 110a–d to the tool 202 and unload cassettes from the tool to the stockers. The loaders 208 are shown in a first position in which cassettes have been loaded. In a second position, as indicated by the arrows extending from the loaders 208, the loaders are positioned for loading cassettes from the stockers 110*a–b*. In the first position, the loaders 208 are positioned for processing of the wafers by the tool 202. When the loaders 208 are in the second position, they physically extend beyond the perimeter of the tool 202. This extended position exposes the loader 208 to collisions with operators and various objects being moved about the factory floor.

The cassettes present in the loaders 208 have example bar code labels 212. It will be appreciated that the cassettes are not individually illustrated in the interest of brevity. When the loader 208 is in the processing position as shown, the bar code label 212 on the cassette 210 is generally obscured from view from the side; in the processing position, the bar code label 212 is viewable from above. It will be appreciated that other electronically recognizable characteristics, such as a strip with a magnetic code, could be used instead of a bar code label.

To support automatic identification of a cassette 210 being moved into an operation, such as wafer sorting by tool 202, a rail 204 having one or more electronic sensors 206 is attached to the tool 202. The rail is shaped to generally conform to a portion of the perimeter of the tool 202, and in the example embodiment, is shaped to extend from the sorter 202 beyond the projections of the loaders 208. The shape serves to protect the loader from accidental collisions and provide support for placement of the electronic sensors 206. The electronic sensors are coupled to an example one of the equipment interface workstations 108*a–d*. When the loaders 208 are in the load position, that is tipped toward the rail 204, the bar code labels 212 are within range of the electronic sensors 206. Under control of the equipment interface workstation, the electronic sensor scans the cassette for identification characteristics, such as a bar code or magnetic strip. Signals generated by the sensors 206 are then provided to the equipment interface workstation for identification.

In an example embodiment, the electronic sensor is a SCANTEAM 3700 model bar code reader that is available from Welch Allyn. However, it will be appreciated that other applications may require other types of electronic sensors. For example, the sensors 206 may form a light curtain around the tool 202, such that when a person or object disturbs the light curtain selected actions are automatically invoked, such as stopping the tool.

Figure 3:
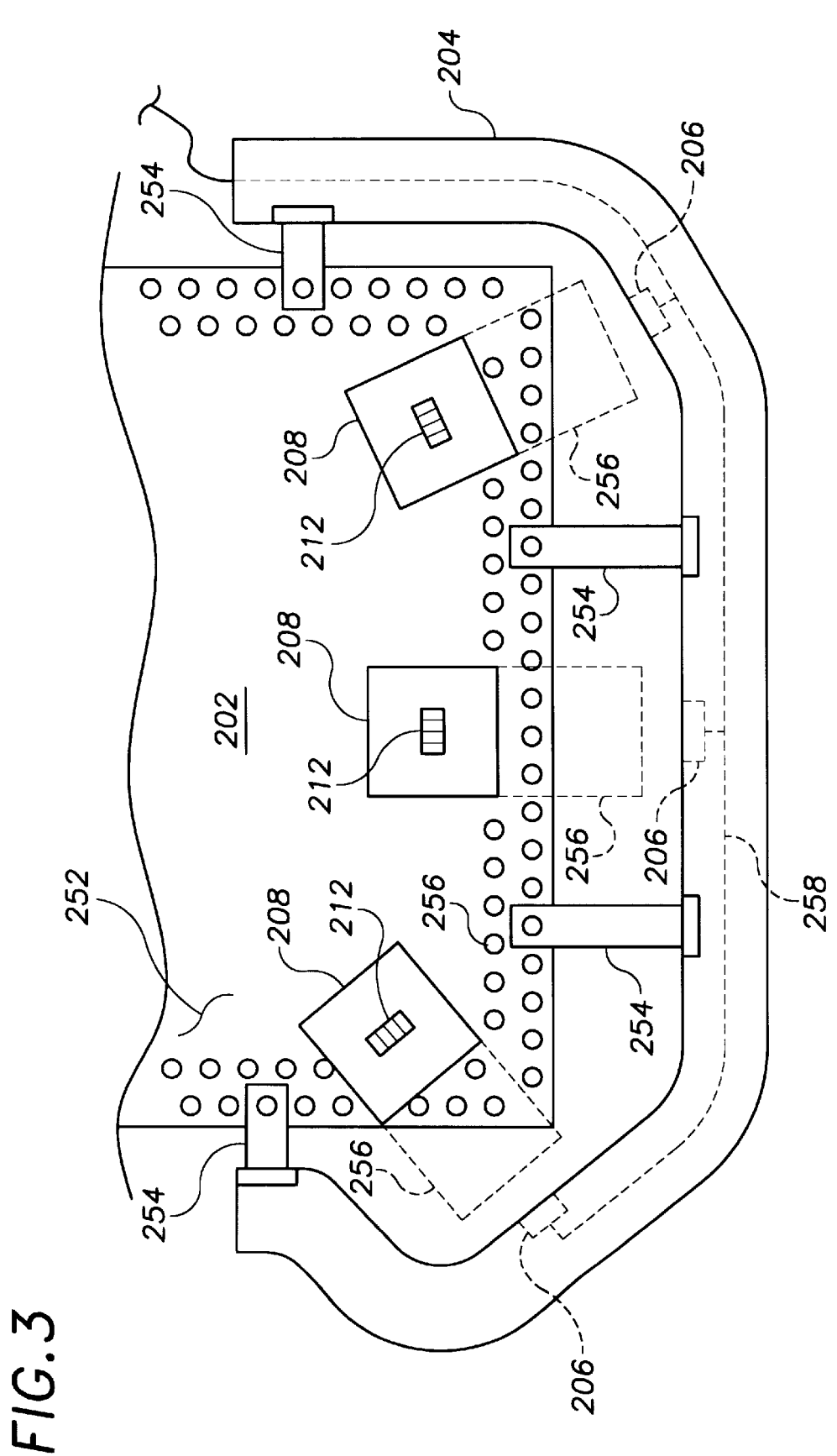
FIG. 3 is a top view of the tool and protective rail illustrated in FIG. 2.

FIG. 3 is a top view of the tool 202 and protective rail 204 illustrated in FIG. 2. The rail 204 is advantageously attached to the shell 252 of the tool 202 with brackets 254 that are welded to the rail 204. Each bracket is secured to the shell 252 with a bolt that is inserted through a corresponding one of the openings 256. The openings 256 are, for example, holes created by the manufacturer of the tool for cooling ventilation. Thus, by bolting the rail to the tool 202 using existing holes in the shell 252, no disassembly or structural modifications to the tool are required.

The electronic sensors 206 are positioned in the rail 204 at locations that correspond to the respective extended positions of the loaders 208. The dashed line blocks 256 represent the extended positions of the loaders 208, wherein the bar codes 212 are readable by the sensors 206. Dashed line 258 represents the cable that couples the sensors 206 to an equipment interface station, for example.

Figure 4:
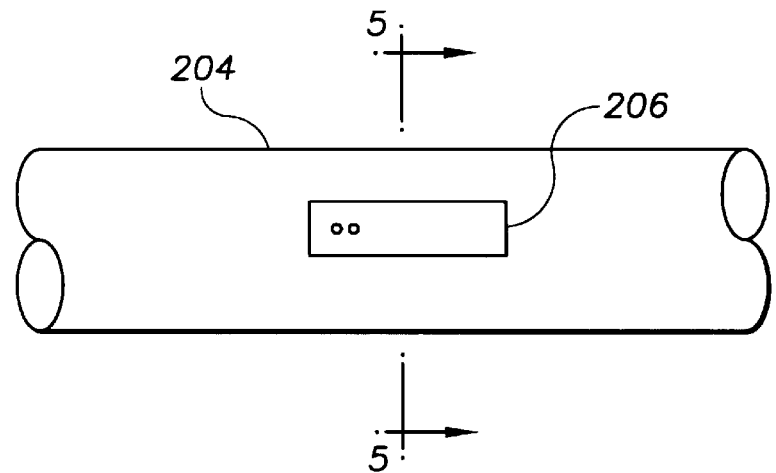
FIG. 4 a partial front view of the protective rail in which an electronic sensor is mounted.

FIG. 4 a partial front view of the protective rail 204 in which an electronic sensor 206 is mounted. In an example embodiment, the rail 204 is formed from a stainless steel tube having an outside diameter of approximately 4"5". The gage of the pipe should be selected to provide adequate support for the sensors 206 and protection of the tool 202 from undesirable contact with humans, or other objects. Various other materials, including plastic and other metals may also be suitable for the protective rail 204 depending upon the application. In another embodiment, the rail 204 can be padded on its outside perimeter to absorb some of the energy from the unwanted contact.

Forming the rail 204 from a pipe or tube is advantageous in that cabling from the sensors 206 can be threaded through the rail, whereby the cabling is both hidden and protected. It will be appreciated that the rail need not be an enclosed tube. Rather, the rail may have a generally c-shaped cross-section.

Figure 5:
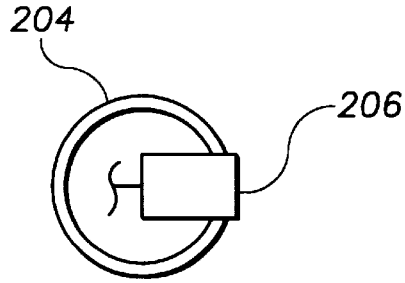
FIG. 5 is a cross-sectional view of the protective rail taken in the direction of arrow 5 of FIG. 4.

FIG. 5 is a cross-sectional view of the protective rail 204 taken in the direction of arrow 5 of FIG. 4. The sensor 206 can be mounted in the rail with any one of a variety of mechanisms chosen in accordance with individual design objectives. In one embodiment, the sensor 206 may have a face plate that clips to the edges of the opening in the rail 204. In another embodiment, a pocket or sleeve can be mounted to edges of the opening and disposed in the rail 204.

The disposition and mounting of the sensor 206 relative to the protective rail 204 is influenced by design requirements. Example requirements for placement of the sensor 206 include: (1) the sensor must not obstruct movement of the object having the information to be read; (2) the sensor must be within range of the object in order to read the information; and (3) the sensor should be protected from undesired contact with people or objects. Mounting the sensor 206 within the rail 204 meets these example requirements, and in addition, provides a conduit for the cabling that couples the sensors to the electronic interface.

Figure 6:
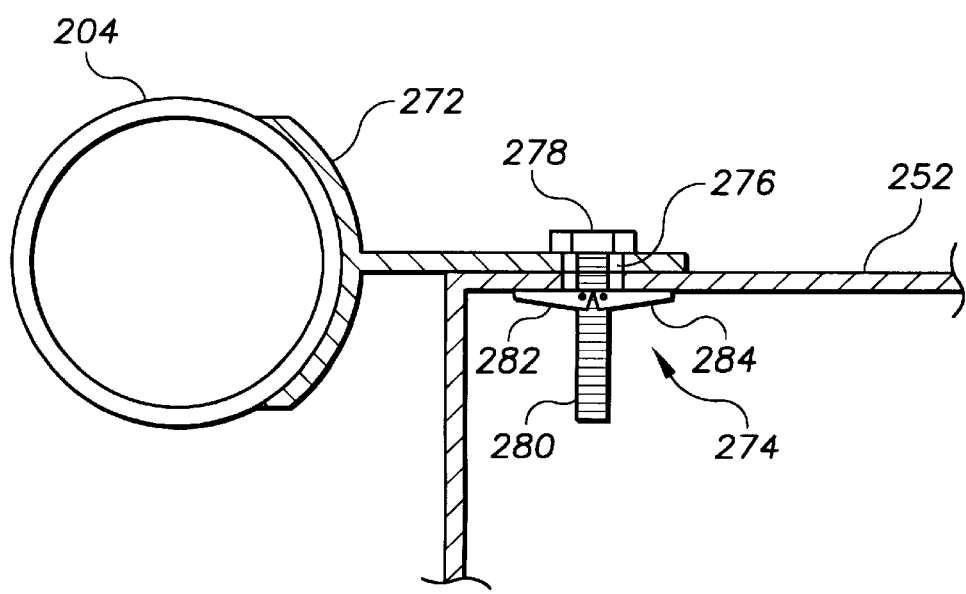
FIG. 6 is a cross-sectional view of the protective rail and attachment mechanism in the direction of arrow 6 of FIG. 2, in accordance with an example embodiment of the invention.

FIG. 6 is a cross-sectional view of the protective rail 204 and attachment mechanism in the direction of arrow 6 of FIG. 2, in accordance with an example embodiment of the invention. The attachment mechanism includes a bracket 272 and a bolt arrangement 274. The bracket 272 is welded to the rail 204, for example, and includes an opening 276 that is sized to accommodate the bolt arrangement 274. The bolt arrangement 274 includes, for example, a bolt 278 and an anchor 280. The anchor includes wing elements 282 and 284, for example, that are pivotably attached to a nut or threaded sleeve. The example bolt arrangement is also sometimes referred to as a toggle bolt, whose usage is well understood for various applications. It will be appreciated that other bolt arrangements may also be suitable, for example, a nut and bolt arrangement or a bolt and cam arrangement. In yet another embodiment, the rail 204 may be attached to the tool 204 with clamps.

Selection of the type of mechanism used to attach the rail 204 to the tool 202 will depend upon the particular tool and when/who attaches the rail. For example, in after market applications where the user of a tool is installing the rail 204, it will be desirable to use a toggle bolt arrangement, or a similarly suited mechanism to permit attachment of the rail without modification or disassembly of the supporting structure of the tool. However, if the tool manufacturer is attaching the rail, more permanent attachment mechanisms may be suitable. For example, the manufacturer could permanently or semi-permanently attach the rail to the tool support structure, such as by welding or with hidden clamps.

Figure 7:
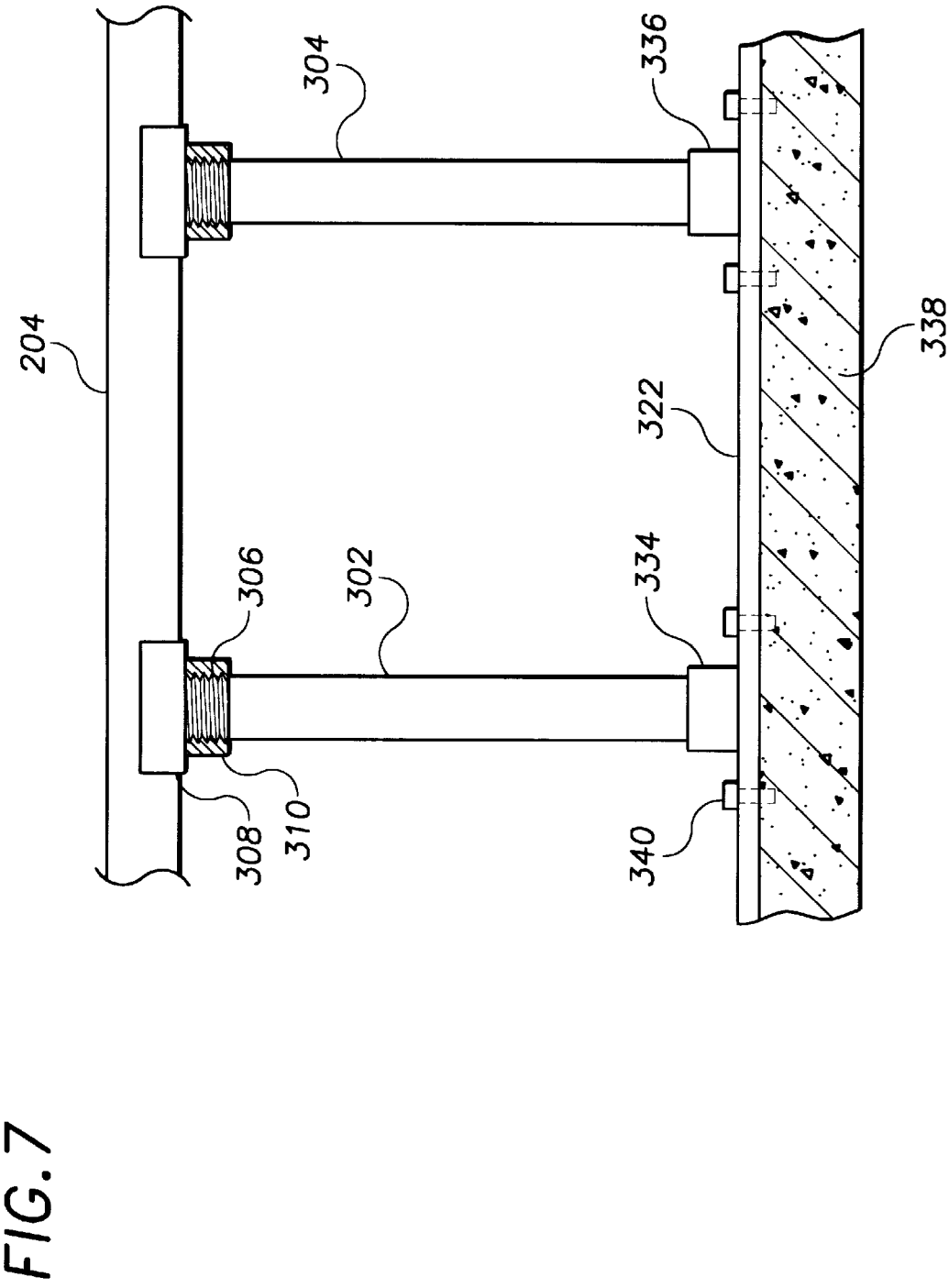
FIG. 7 is a side view of an alternate support structure for the rail according to another example embodiment of the invention.

FIG. 7 is a side view of an alternate support structure for the rail 204 according to another example embodiment of the invention. Generally, the rail 204 is supported by vertical support members 302 and 304. Such an arrangement is intended to be free-standing relative to the tool 202 which the rail 204 is intended to protect. The free-standing structure may be especially suitable for after market applications where the tool has no structure available to which to attach the rail without disassembling the tool.

In an example embodiment, each support member may be a steel pipe having at least one threaded end 306. A support bracket 308 is welded to or formed with the rail 204 and has a threaded female member to engage the threaded end 306 of the support member 302. This arrangement provides a mechanism for easily adjusting the height of the rail. Height adjustment may be important for aligning the electronic sensors 206 with the articles to be scanned. In other example embodiments, the support members 302 and 304 may be height adjustable by way of clamps, or alternatively, holes bored in the support members near the sleeve 310 with pins inserted in the holes to adjust the height. It will be appreciated that the height of the rail 204 may be set according to commonly known ergonomic standards, for example standards associated with semiconductor tools.

The support members 302 and 304 are secured to a base plate 322, for example with metal sleeves 334 and 336 which are welded to the plate. The base plate 332 can be secured to the floor 338 by anchor bolts 340, for example. In other applications it may be suitable to anchor the support members 302 and 304 directly to the floor.

Those skilled in the art will appreciate that other support structures may be suitable depending upon the manufacturing environment and structure that surrounds the tool. For example, the rail 204 may be supported by a wall mount arrangement if there is a suitable wall close to the tool.

Alternatively, the rail 204 may be part of a conventional gate arrangement (not shown) wherein the rail 204 can be swung away from the tool 202. Such a gate arrangement may be desirable to permit servicing the tool. Those skilled in the art will appreciate that the rail 204 may also have a vertical support provided opposite the hinged end. In addition, or alternatively, the rail may also be secured to the tool.

As noted above, the present invention is applicable to a number of different machines in computer controlled manufacturing arrangement. Accordingly, the present invention should not be considered limited to the particular examples described above, but rather should be understood to cover all aspects of the invention as fairly set out in the attached claims. Various modifications, equivalent structures, as well as numerous structures to which the present invention may be applicable will be readily apparent to those of skill in the art upon review of the present specification. The claims are intended to cover such modifications and devices.

What is claimed is:

1. An apparatus for identification of work pieces and protection of equipment used to operate on the work pieces in a computer controlled manufacturing arrangement, the equipment having at least one receptacle for holding a work piece, comprising:

a rail shaped to generally surround a selected portion of the equipment, the rail arranged to be supported proximate the equipment to deflect objects from the equipment; and an electronic sensor mounted to the rail at a location to sense a work piece in the receptacle and arranged to be coupled to the computer.

2. The apparatus of claim 1, wherein the rail is generally tubular and has an opening arranged to be aligned with the receptacle, the sensor mounted in the rail at the opening.

3. The apparatus of claim 2, wherein the sensor is a bar code reader.

4. The apparatus of claim 1, wherein the sensor is a bar code reader.

5. The apparatus of claim 1, wherein the sensor is a magnetic code reader.

6. The apparatus of claim 1, further comprising a plurality of brackets mounted on the rail.

7. The apparatus of claim 6, wherein each of the brackets has an opening sized to accommodate a bolt of a selected size.

8. The apparatus of claim 7, further comprising a toggle bolt passing through the opening and secured to an opening in the equipment.

9. The apparatus of claim 6, wherein each of the brackets includes a clamp arranged to attach to the equipment.

10. The apparatus of claim 6, further comprising a plurality of vertical support members attached to the brackets.

11. The apparatus of claim 1, wherein the equipment has a plurality of receptacles arranged to hold a plurality of work pieces, the apparatus further comprising a plurality of electronic sensors mounted on the rail at locations to sense work pieces in the plurality of receptacles, respectively, and arranged to be coupled to the computer.

12. The apparatus of claim 1, further comprising a plurality of vertical support members attached to the rail.

13. The apparatus of claim 12, wherein the vertical support members are height adjustable.

14. The apparatus of claim 1, wherein the rail is metal.

15. The apparatus of claim 14 wherein the metal is stainless steel.

\* \* \* \* \*

UNITED STATES PATENT AND TRADEMARK OFFICE
CERTIFICATE OF CORRECTION

PATENT NO. : 6,216,948 B1
DATED : April 17, 2001
INVENTOR(S) : Conboy et al.

It is certified that error appears in the above-identified patent and that said Letters Patent is hereby corrected as shown below:

<u>Title page,</u>
Item [57], ABSTRACT,
Line 7, please delete the second occurrence of "to".

<u>Column 1,</u>
Line 15, please delete "is".

<u>Column 2,</u>
Line 3, "4 a" should read -- 4 is a --.
Line 13, "invention;" should read -- invention. --.

<u>Column 4,</u>
Line 1, "4"5" " should read -- 4" - 5" --.

Signed and Sealed this

Twenty-first Day of January, 2003

JAMES E. ROGAN
*Director of the United States Patent and Trademark Office*